UNITED STATES PATENT OFFICE.

LUCIEN PAUL BASSET, OF MONTMORENCY, FRANCE.

PROCESS OF MANUFACTURING CEMENT OR HYDRAULIC LIME FROM PLASTER.

1,198,817.  Specification of Letters Patent.  Patented Sept. 19, 1916.

No Drawing.  Application filed November 25, 1913. Serial No. 803,004.

*To all whom it may concern:*

Be it known that I, LUCIEN P. BASSET, a citizen of the French Republic, and resident of Montmorency, France, have invented certain new and useful Improvements in Processes of Manufacturing Cement or Hydraulic Lime from Plaster.

The present invention has for its object a process of manufacturing cement or hydraulic lime, with simultaneous production of sulfurous anhydrid or sulfur, based upon the decomposition of sulfate of lime by clay at a high temperature.

This invention comprehends certain improvements and variations over applications filed by me on December 17, 1912, Serial No. 737,331, and March 4, 1914, Serial No. 822,289. In application No. 737,331, a process is described for the manufacture of cement which is differentiated from the present invention in that two steps are required for the completion of the process, while in the present invention, the entire process is designed to take place in one step. The present invention is further differentiated in that an excess of calcium sulfate is employed. In application No. 822,289, calcium sulfate, which occurs in the process of said application, is treated with an excess of calcium sulfid, while in the present invention no such provision is made.

If plaster of Paris and clay were simply placed together as the sulfate of lime is very fixed, it would require a great quantity of combustible to be decomposed further, the reaction would take place slowly and would not be complete.

The new process has for its object to facilitate the decomposition of sulfate of lime and to render it rapid and complete.

Another object is to carry out the process to be presently described.

This process consists essentially in adding coal or charcoal to the mixture of plaster and clay, and in causing steam to act upon this mixture. The decomposition of the pure plaster requires, theoretically, and in making the abstraction by the action of clay, 118.8 calories per gram. By the addition of coal or charcoal the stability of the sulfate is diminished. If the quantity of coal or charcoal is that necessary to convert the sulfate of lime into sulfite, the quantity of heat is reduced to 61.8. The decomposition of plaster of Paris is thus facilitated, nevertheless it would not be comparable to that of carbonate of lime, which only requires 43.4 calories. It is possible to make it quite as easy, by adding more coal or charcoal than is necessary to transform the sulfate into sulfite. With 10% of coal or charcoal, the decomposition takes place at about the same temperature as that of carbonate of lime. In this case there is disengaged a little sulfur, as one is compelled to operate in an oxidizing atmosphere, this sulfur burns and is transformed into sulfurous acid.

The steam assists considerably the decomposition of the sulfate of lime. This result is due to the fact that it permits the formation of hydrogen by the dissociation of sulfureted hydrogen, taking place in the reaction of the steam upon the sulfid of lime, this latter being produced by the reduction of the sulfate by coal or charcoal by the action of steam upon the coal or charcoal. The hydrogen thus liberated, due to its physical state has a reducing power with respect to plaster of Paris much above that of sulfid of calcium or coal or charcoal. Further, steam has the advantage of acting directly upon the sulfate of lime, in the presence of clay without causing intermediate reactions. Owing to the steam, the decomposition of plaster of Paris is rapid and complete, and by operating in an atmosphere distinctly oxidizing, there does not remain a trace of sulfid of calcium.

As the first materials do not generally contain iron, a small quantity of oxid of iron, about 2%, is preferably added. This oxid has a double purpose; it, in the first place, facilitates the reaction, in the second place, it acts as a flux and changes to a state of ferrite of calcium which is an element in cement.

In carrying the present invention into effect, an intimate mixture is made of plaster of Paris, clay, coal or charcoal, and oxid of iron if necessary, in convenient proportions: The proportion of calcium sulfate used should bear such a relation to the proportion of clay used that the resulting cement will be basic in character, an excess of calcium sulfate will generally be necessary. This mixture, either dry or in the condition of mud, is passed into a furnace, preferably a rotary furnace, which enables the state of the products of combustion to be easily regulated. All furnaces capable of satisfying this condition will be suitable. In case a rotary furnace is not employed, it would be necessary to put the mixture into the form of briquets.

The steam necessary for the reaction may be introduced into the furnace in several manners: It may be introduced in the form of steam, superheated or not, or it may be produced during the combustion of a gas containing hydrogen, as gas, water illuminating gas or crude petroleum, or fatty combustible matter containing a large quantity of volatile matter, that is to say, rich in hydrogen. The mixture burnt under these conditions furnishes upon crushing, cement or "hydraulic," practically pure.

The invention enables flowers of sulfur, for example, to be obtained instead of sulfurous anhydrid. In order to accomplish this it is necessary to increase the quantity of coal or charcoal so as to transform into sulfur, the three quarters of the sulfate of lime present. The following reaction takes place:

$$3SCa + SO_4Ca = 4CaO + 4S$$

The lime liberated combines with the elements of the clay to produce cement or hydraulic lime according to the relative quantities of lime and clay.

In practice to realize the above reaction, it is necessary to work in an atmosphere neither oxidizing nor reducing so as to prevent as much the combustion of sulfur as the formation of oxisulfid of carbon.

I wish it to be understood that the details of the method of carrying into effect the improved process, the proportions of the materials in reaction and the like may be changed without departing from the scope of the invention.

I claim:

A process of manufacturing cement which consists in subjecting to a high temperature a mixture composed of clay with an excess thereover of calcium sulfate in the presence of coal and steam.

In testimony whereof I have hereunto set my hand in presence of two witnesses.

LUCIEN PAUL BASSET.

Witnesses:
HANSON C. COXE,
JOHN BAKER.

Copies of this patent may be obtained for five cents each, by addressing the "Commissioner of Patents, Washington, D. C."